(12) United States Patent
Nitta (10) Patent No.: US 9,385,376 B2
(45) Date of Patent: Jul. 5, 2016

(54) MANUFACTURING METHOD OF FIBROUS PEROVSKITE-TYPE OXIDE CATALYST

(71) Applicant: Toyota Jidosha Kabushiki Kaisha, Toyota-shi, Aichi-ken (JP)

(72) Inventor: Iwao Nitta, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/856,034

(22) Filed: Sep. 16, 2015

(65) Prior Publication Data
US 2016/0079603 A1 Mar. 17, 2016

(30) Foreign Application Priority Data
Sep. 17, 2014 (JP) ................................. 2014-188923

(51) Int. Cl.
*B01J 23/00* (2006.01)
*H01M 4/90* (2006.01)

(52) U.S. Cl.
CPC .................................. *H01M 4/9016* (2013.01)

(58) Field of Classification Search
CPC .. Y02E 60/50; H01M 4/9016; H01M 4/9025; H01M 4/9033
See application file for complete search history.

(56) References Cited

U.S. PATENT DOCUMENTS 5,494,700 A * 2/1996 Anderson ............ B01D 53/228
427/115
2009/0202869 A1 8/2009 Sawaki et al.

FOREIGN PATENT DOCUMENTS

| JP | 2007-335171 A | 12/2007 |
| JP | 2009-197351 A | 9/2009 |
| JP | 2012-001865 A | 1/2012 |

OTHER PUBLICATIONS

Yoshinobu et al. "Machine Translation of JP2009197351" Mar. 9, 2009.*
Xu et al. "Perovskite-Type Oxide Membranes for the Oxidative Coupling of Methane" Ceramic Membranes and Thin Films vol. 43, Issue Supplement S11, 1997 pp. 2731-2740.*

* cited by examiner

*Primary Examiner* — Matthew E Hoban
*Assistant Examiner* — Haytham Soliman
(74) *Attorney, Agent, or Firm* — Dinsmore & Shohl LLP (57) ABSTRACT

A manufacturing method of a fibrous perovskite-type oxide catalyst includes: a first preparing step; a jetting step; a heating step; and an impregnating step. The first preparing step prepares a first solution by mixing metal salts containing La, Sr, Fe, Co and O elements, a first polymer, a metal salt containing a Zn element and a first solvent. The jetting step jets the first solution by using an electrospinning method to produce a precursor fiber. The heating step heats the precursor fiber to produce a perovskite-type oxide mixed with a Zn oxide. The impregnating step impregnates the perovskite-type oxide with an alkaline solution to remove the Zn oxide.

4 Claims, 6 Drawing Sheets

MANUFACTURING METHOD OF FIBROUS PEROVSKITE-TYPE OXIDE CATALYST

BACKGROUND OF THE INVENTION

1. Field of the Invention

The present invention relates to a manufacturing method of a fibrous perovskite-type oxide catalyst.

2. Description of the Related Art

An air battery is known as a means for storing and using electrical energy effectively. In the air battery, a cathode active material is not necessary, and therefore an anode active material can be placed in the most part of the battery case. Therefore, the air battery has a great energy density theoretically. That is, the air battery is capable of having great capacity, and thus is attracting attention.

A catalyst which oxidizes and reduces oxide is used as an air electrode of the air battery. As a material for the catalyst, for example, a fibrous ceramic material is disclosed in a patent document 1. The fibrous ceramic material is formed by an electrospinning method, includes La—Sr—Fe—Co—O of a perovskite-type material and is used as an air electrode of a fuel cell and an electrode catalyst for an electrochemical cell.

CITATION LIST

[Patent Document 1]
Japanese Unexamined patent publication No. 2009-197351

SUMMARY OF THE INVENTION

Even though patent document 1 discloses a fibrous perovskite-type oxide catalyst as the fibrous ceramic material, it does not disclose the catalyst characteristics such as oxygen reduction activity. Accordingly, the inventor has formed the fibrous perovskite-type oxide catalyst by the electrospinning method to evaluate the catalyst characteristics and has now newly discovered that the oxygen reduction activity is not high. A fibrous perovskite-type oxide catalyst is considered to have a potential of an increases in a specific surface area and electron and ion carrier paths, and therefore a technique is desired which can improve the oxygen reduction activity of the fibrous perovskite-type oxide catalyst.

According to one aspect of the present invention, a manufacturing method of a fibrous perovskite-type oxide catalyst is provided, which includes: a first preparing step of preparing a first solution by mixing metal salts containing La, Sr, Fe, Co and O elements, a first polymer, a metal salt containing a Zn element and a first solvent; a jetting step of jetting the first solution by using an electrospinning method to produce a precursor fiber; a heating step of heating the precursor fiber to produce a perovskite-type oxide mixed with a Zn oxide; and an impregnating step of impregnating the perovskite-type oxide with an alkaline solution to remove the Zn oxide.

According to the present invention, the oxygen reduction activity of the fibrous perovskite-type oxide catalyst can be improved.

DESCRIPTION OF EMBODIMENTS

In the present embodiment, a manufacturing method of a fibrous perovskite-type oxide catalyst is provided, which includes: a first preparing step of preparing a first solution by mixing metal salts containing La, Sr, Fe, Co and O elements, a first polymer, a metal salt containing a Zn element and a first solvent; a jetting step of jetting the first solution by using an electrospinning method to produce a precursor fiber; a heating step of heating the precursor fiber to produce a perovskite-type oxide mixed with Zn oxides; and an impregnating step of impregnating the perovskite-type oxide with an alkaline solution to remove the Zn oxides. The perovskite-type oxide is an oxide which has a perovskite phase as a crystal phase.

The inventor has studied a fibrous perovskite-type oxide catalyst and has obtained the following results. A fibrous perovskite-type oxide catalyst with very large specific surface area can be obtained by using a method, which has steps of adding an additive agent, namely a Zn source, to a first solution that includes base materials of a perovskite-type oxide catalyst; performing spinning of the first solution by using the electrospinning method; performing a heat treatment on a precursor fiber obtained by the spinning; and performing an alkaline treatment on a fibrous perovskite-type oxide obtained by the heat treatment. The reason why the specific surface area is increased is that the Zn oxide formed by the heat treatment with the perovskite-type oxide is dissolved and removed by the alkaline treatment and that new pores are formed at places where the Zn oxide exists which causes an increase in the pores. Since areas where an electrochemical reaction occurs are increased, active sites of the electrochemical reaction are increased, and consequently the oxygen reduction activity is improved. Also, the perovskite-type oxide catalyst has the structure in which fibrous catalysts are tangled with each other and have many gaps around them. Therefore, for example, if the perovskite-type oxide catalyst is used for the air electrode of the air battery, since many macro pores (gaps) exist inside the air electrode in addition to the pores, the transportation of oxygen and water used in the electrochemical reaction can be facilitated through the macro pores. As mentioned above, according to the present embodiment, the fibrous perovskite-type oxide catalyst with the preferable oxygen reduction activity can be obtained.

The manufacturing method of the fibrous perovskite-type oxide catalyst according to the present (hereinafter referred to as the present manufacturing method) will be described in detail.

In the present manufacturing method, a catalyst is manufactured, the catalyst including a perovskite-type oxide catalyst of $La_{1-x}Sr_xFe_{1-y}Co_yO_3$ ($0<x<1$, $0<y<1$) which contains La, Sr, Fe, Co and O as constituent elements. The catalyst is preferable because it has high oxygen reduction activity and oxygen generation activity and also has high durability. Here, from a viewpoint of obtaining higher oxygen reduction activity, higher oxygen generation activity and higher durability, $0.6 \leq x < 1$ and $0.2 \leq y \leq 0.6$ are preferable, and $0.7 \leq x \leq 0.9$ and $0.3 \leq y \leq 0.5$ are more preferable. Specifically, about $x=0.8$ and $y=0.4$ of $La_{0.2}Sr_{0.8}Fe_{0.6}Co_{0.4}O_3$ is further more preferable. However, in each case, inevitable impurities and dopants which do not degrade the above characteristics may be included.

In the first preparing step of the present manufacturing method, the first solution is prepared by mixing the metal salts containing La, Sr, Fe, Co and O elements, the first polymer, the metal salt containing a Zn element and the first solvent. There is no limit to the metal salts containing La, Sr, Fe, Co and O elements of base materials. For example, $La(NO_3)_3$ and $La_2(CO_3)_3$ may be named as the metal salt containing La, $Sr(NO_3)_2$ and $SrCO_3$ may be named as the metal salt containing Sr, $Fe(NO_3)_3$ and $FeCO_3$ may be named as the metal salt containing Fe and $Co(NO_3)_2$ and $CoCO_3$ may be named as the metal salt containing Co. Here, one metal salt may contain more than one element in La, Sr, Fe, Co and O elements.

As the additive agent added to the above first solution, which is the metal salt containing Zn, $Zn(NO_3)_2$ and $ZnCO_3$ may be named as examples. The metal salt containing Zn is mixed to the first solution with the above base materials, and changed to the Zn oxide deposited on the perovskite-type oxide after the spinning by the electrospinning method and the heat treatment. The Zn oxide, namely ZnO is dissolved and removed by the alkali treatment or the like and therefore a lot of pores are formed on the surface of the perovskite-type oxide. Consequently, the specific surface area can be increased. The perovskite-type oxide is not affected by the alkaline treatment because it is not an acid treatment. The above mentioned additive agent is not limited to the metal salt containing Zn. The additive agent may include an element which cannot be taken in the perovskite-type oxide, that is, cannot be replaced with any of La, Sr, Fe and Co, and of which oxide formed by the heat treatment can be solved and removed by the alkaline treatment. As the additive agent, a metal salt containing an amphoteric element is exemplified. The amphoteric element, for example, includes Al, Sn, Pb and Be. The mole ratio of the metal salt containing Zn element (the additive agent) to the metal salts containing La, Sr, Fe, Co and O elements, as described later, is set such that the weight ratio of the Zn oxide to the La—Sr—Fe—Co—O perovskite-type oxide is a desirable ratio. The weight ratio will be described later.

There is no limit to the first polymer added to the above mentioned first solution if the polymer can be used for the electrospinning method. The first polymer, for example, may include PVP (polyvinylpyrrolidone), PVA (polyvinyl alcohol) and PCL (polycaprolactone). There is no limit to the first solvent added to the above mentioned first solution if the first solvent can be used for the electrospinning method. The first solvent, for example, may include DMAc (dimethylacetamide), HFIP (hexafluoroisopropanol) and DMF (dimethylformamide).

In the first solution, the weight ratio of the first polymer to the sum of the metal salts containing La, Sr, Fe, Co and Zn elements is preferably 1:99 to 50:50 and more preferably 5:95 to 20:80. In the first solution, the weight ration of the first polymer and the sum of the metal salts to the first solvent is preferably 5:95 to 25:75 and more preferably 10:90 to 20:80. These weight ranges are determined from a viewpoint of enabling spinning with desirable characteristics in the electrospinning method.

In the jetting step of the present manufacturing method, the first solution is jetted by using an electrospinning method to produce a precursor fiber. That is, the precursor is produced for manufacturing the perovskite-type oxide indicated by $La_{1-x}Sr_xFe_{1-y}Co_yO_3$. The electrospinning method is a method that a high voltage is applied between a collector and a polymer solution in a syringe; the polymer solution is jetted from the syringe nozzle to the collector while the polymer solution is charged by the high voltage and therefore is split by electrostatic repulsion; and finally fine fibers are obtained on the collector. The reason why the electrospinning method is used in the jetting step of the present manufacturing method is as follows. The precursor (fiber) produced by the electrospinning method has high specific surface area as compared with a precursor (powder sample) produced by a wet-mixing method. Therefore the perovskite-type oxide catalyst formed from the precursor fiber also has high specific surface area. Accordingly, a reaction field capable of contributing the electrochemical reaction can be increased. Specifically, in the present embodiment, by using an innovative method in which the additive agent is added to the first solution and the formed oxide is removed by the alkaline solution, the specific surface area can be further increased remarkably.

Parameters of the electrospinning method are classified into solution characteristics, spinning conditions and spinning circumstances. In particular, important parameters are a polymer concentration, a solution sending speed, an atmospheric humidity, an applying voltage, a distance between the syringe nozzle to the collector and a type of solvent. Depending on the combination of these parameters, the configuration (shape, orientation etc.) of the precursor fiber can be adjusted for having desirable characteristics. There is no limit to the values of these parameters if the values are in the ranges in which the perovskite-type oxide catalyst formed from the precursor fiber has the desirable characteristics. For example, the polymer concentration, which is the concentration of the first polymer to the first solution, is preferably 1 to 50 wt % and more preferably 5 to 20 wt %. The solution sending speed is preferably 0.01 to 5 ml/hr and more preferably 0.1 to 1 ml/hr. The atmospheric humidity is preferably equal to or less than 60% and more preferably equal to or less than 40%. The applying voltage is preferably 1 to 100 kV and more preferably 10 to 50 kV. The distance between the syringe nozzle to the collector is preferably 5 to 50 cm and more preferably 10 to 30 cm. The type of solvent is preferably DMAc. The other conditions are suitably adjusted such that the desirable configuration (shape orientation etc.) of the precursor fiber can be obtained.

In the heating step of the present manufacturing method, the perovskite-type oxide mixed with the Zn oxide is produced by heating the precursor fiber. There is no limit to the temperature of the heat treatment if the perovskite-type oxide can be formed from the precursor fiber. The temperature, for example, is 500 to 1000° C. The heat treatment may be performed once or the heat treatment may be performed more than once. For example, the first heat treatment is performed in 120 to 300° C., the second heat treatment is performed in 300 to 600° C., and the third heat treatment is performed in 600 to 1000° C. There is no limit to the atmosphere of the heat treatment if the perovskite-type oxide can be formed from the precursor fiber. The atmosphere may be inert atmosphere or may be oxidizing atmosphere. The inert atmosphere, for example, is Ar atmosphere and $N_2$ atmosphere. By this heat treatment, the fibrous perovskite-type oxide catalyst can be produced from the precursor fiber. In this case, Zn in the metal salt of Zn is hardly taken in the perovskite-type oxide as its component and becomes oxide such as ZnO. ZnO may be present on the surface of the fibrous perovskite-type oxide catalyst and also may be dispersed in the inside of the fibrous perovskite-type oxide catalyst. The precursor fiber may be crushed before the heat treatment.

To enlarge the specific surface area of the perovskite-type oxide catalyst as much as possible, it is preferable that a lot of pores where the Zn oxide has been removed by the alkaline treatment are formed. To form a lot of pores, it is preferable that the amount of the Zn oxide is great. In addition, to make electrochemical reaction occur as much as possible, it is preferable that the perovskite-type oxide which has a role of the reaction is formed with a sufficient amount. To form the sufficient amount of the perovskite-type oxide, it is preferable that the amount of the perovskite-type oxide is great. According to these considerations, the ratio of the perovskite-type oxide catalyst indicated as $La_{1-x}Sr_xFe_{1-y}Co_yO_3$ to the Zn oxide indicated as ZnO is preferably 1:9 to 9:1, more preferably 4:6 to 6:4. Specifically, the ratio is further more preferably about 5:5 (=1:1).

In the impregnating step of the present manufacturing method, the perovskite-type oxide is impregnated with an alkaline solution to remove the Zn oxides. There is no limit to the alkaline solution if the Zn oxide can be solved and removed by using the alkaline solution. The alkaline solution, for example, may include $NH_4Cl$ and NaOH. By this alkaline treatment, the Zn oxide dispersed on the surface and in the inside of the fibrous perovskite-type oxide catalyst is removed and the perovskite-type oxide catalyst is not dissolved and still remains because the treatment is not the acid treatment. In this case, since the pore is formed at the place where the Zn oxide has been present, a lot of pores are formed in the fibrous perovskite-type oxide catalyst. Accordingly, the fibrous perovskite-type oxide catalyst having the remarkably large specific surface area can be obtained. This fibrous perovskite-type oxide catalyst can have characteristics that the active sites where the electrochemical reaction occurs are so many and the oxygen reduction activity is very high.

When the fibrous perovskite-type oxide catalyst obtained according to the above method is used for the air electrode, that is, the electrode body of the air battery, the fibrous perovskite-type oxide catalyst is carried on carbon. Specifically, the fibrous perovskite-type oxide catalyst, carrier carbon and binder are physically mixed.

There is no limit to the carbon carrier. The carrier carbon, for example, may include carbon black, activated carbon, carbon nanofibers, carbon nanotubes, other element-doped carbon, mesoporous carbon and VGCF (vapor-grown carbon fiber). Preferably, the Vulcan (specific surface area: 242 m$^2$/g) produced by Cabot Corporation, the KETJENBLACK (specific surface area: 1320 m$^2$/g) produced by Lion Specialty Chemicals Co., Ltd., C65 (specific surface area: 65 m$^2$/g) produced by TIMCAL Graphite & Carbon are exemplified as the carbon carrier which has a high conductivity, high geometrical and electrochemical specific surface areas and high oxidation-reduction resistance.

The weight ratio of the fibrous perovskite-type oxide catalyst to the sum of the fibrous perovskite-type oxide catalyst and the carrier carbon, that is, the carrying ratio is 5 to 95 wt %, preferably 30 to 60 wt % and more preferably 40 to 50 wt %. According to the study of the inventor, it is considered that the oxygen reduction reaction on the electrode catalyst, that is, 4-electron reduction reaction ($O_2+2H_2O+4e^-\rightarrow 4OH^-$) is consist of the first 2-electron reduction reaction ($O_2+H_2O+2e^-\rightarrow HO_2^-+OH^-$) occurring at first and the second 2-electron reduction reaction ($HO_2^-+H_2O+2e^-\rightarrow 3OH^-$) occurring next to the first reaction. In addition, it is considered that the first 2-electron reduction reaction occurs mainly on the carrier carbon and the second 2-electron reduction reaction occurs mainly on the fibrous perovskite-type oxide catalyst. Therefore, if the carrying ratio is greater than the upper limit of the range of the above-mentioned carrying ratio, it causes lack of electron conductivity and the first 2-electron reduction reaction does not sufficiently occur on the carrier carbon. On the other hand, if the carrying ratio is smaller than the lower limit of the range of the above-mentioned carrying ratio, even though the first 2-electron reduction reaction occurs, the second 2-electron reduction reaction does not sufficiently occur. Then, the carrier carbon is oxidized and dissolved by the attack of the peroxide ($HO_2^-$ etc.) which is a reaction precursor, causing that the durability of the electrode catalyst is lowered and the rate of the chemical reaction is decreased.

There is no limit to the binder. The binder, for example, is preferably used ion conductive polymer such as PTFE (polytetrafluoroethylene) and PVDF (polyvinylidene fluoride). The amount of the added binder may be adjusted such that the thickness of the electrode, the oxygen permeability, electron conductivity and ion conductivity are appropriate for forming a good three-phase interface. The amount of the added binder, for example, is 5 to 75 wt %.

When the air electrode is produced, the electrode body of a self-supported film is formed by rolling the mixture of the fibrous perovskite-type oxide catalyst, the carrier carbon and the binder. Alternatively, the electrode body is formed by applying slurry with the above-mentioned mixture to the collector using an arbitrary application method; drying the applied slurry; and rolling the dried slurry if it's necessary. The hydrophobic treatment or the like is preferably performed on an air-opposed surface of the electrode body for avoiding leakage of electrolyte solution.

As the collector, a supporting body which can function as an electrode of an air battery can be used. As the supporting body which has oxygen permeability and electron conductivity, porous material such as foam metal, metal mesh and carbon paper and anion electrolyte are exemplified. As material of the metal, stainless steel, aluminum, nickel, iron and titanium are exemplified. As the method of applying the slurry to the collector, a dip-coating method, a spray coating method, a roll coating method, a doctor blade method, a gravure coating method and a screen printing method are exemplified.

The present manufacturing method may further include a second preparing step of preparing a second solution by mixing material containing carbon element, a second polymer and a second solvent. In this case, in the jetting step, the first solution of the first preparing step and the second solution of the second preparing step are jetted concurrently by the electrospinning method. There is no limit to material containing carbon element of the second preparing step if material includes carbon element. As the material containing carbon element, PAN (polyacrylonitrile), saccharide such as sucrose and the like are exemplified. As the polymer and solvent of the second solution, the polymer and solvent of the first solution may be used.

The weight ratio of the second polymer to the material containing carbon element of the second solution is preferably 5:95 to 50:50 and more preferably 10:90 to 30:70. The weight ratio of the sum of the second polymer and the material containing carbon element to the second solvent of the second solution is preferably 5:95 to 25:75 and more preferably 10:90 to 20:80. These ranges are determined from a viewpoint of enabling spinning with desirable characteristics in the electrospinning method.

In the second preparing step and the jetting step, at the process of preparing the precursor of the perovskite-type oxide catalyst expressed in $La_{1-x}Sr_xFe_{1-y}Co_yO_3$, by adding a source of carbon which will be a carrier, a structure in which the carbon carrier is closely complexed with the perovskite-type oxide catalyst is formed after the heating step. In this case, unlike in the case of just physically mixing the carbon and the perovskite-type oxide catalyst, the structure in which the carbon (a carrier and an electric conductor) is closely attached to the fibrous perovskite-type oxide catalyst can be achieved. Therefore, the peroxide ($HO_2^-$ etc.) which is a reaction precursor generated by the first 2-electron reduction reaction on the carbon closely attached to the perovskite-type oxide catalyst can be spilled over the perovskite-type oxide catalyst effectively. After that, since the second 2-electron reduction reaction occurs on the fibrous perovskite-type oxide catalyst having optimum composition and the high specific surface area, the target 4-electron reduction reaction can be produced effectively and the final product of $OH^-$ can be created effectively. Consequently, overvoltage regarding the oxygen reduction reaction can be decreased and the output properties of the battery can be improved. Such carbon is regarded as a promoter which promotes the electron reduction reaction.

As described above, in the present manufacturing method of the fibrous perovskite-type oxide catalyst, the oxygen reduction reaction can be improved by dissolving and removing Zn oxide derived from the additive agent to form a lot of pores and consequently to increase the electrochemical reaction area. In addition, when the precursor fiber is formed, by adding the carbon source to form the structure in which the carbon (a carrier and an electric conductor) is closely attached to the fibrous perovskite-type oxide catalyst, the oxygen reduction property can be more improved and also the overvoltage of the oxygen generation can be improved. Furthermore, if such perovskite-type oxide catalyst is used for the air electrode of the air battery, since the catalyst has fibrous shape and therefore a lot of macro pores are present in the air electrode, the transportation of oxygen and water used in the electrochemical reaction can be facilitated. Also, the catalyst cost can be reduced by introducing Fe as metal used for the perovskite-type oxide catalyst.

Next, the air battery according to the embodiment of the present invention will be described.

(Air Electrode)

The electrode body manufactured using the above-mentioned manufacturing process can be used for the air electrode (catalyst layer).

(Anode Electrode)

The anode includes an anode active material and an anode collector. As the anode active material, metal material, alloy material and carbon material are exemplified. For example, alkali metal such as lithium, sodium and potassium, alkali earth metal such as magnesium and calcium, group 13th elements such as aluminum, transition metal such as zinc, iron, nickel, titanium and silver, platinum group elements such as platinum, (alloy) material including these metals, or, carbon material such as graphite are given. Also, anode material which can be used for a lithium ion battery and the like is given. Specifically, as material including metal on which charge and discharge can be performed effectively, for example, hydrogen storing alloy such as $AB_5$-type rare earth alloy ($LaNi_5$ and the like) and BCC alloy (Ti—V and the like), and, metal such as platinum, zinc, iron, aluminum, magnesium, lithium, sodium and cadmium are given. In addition, as material of the anode collector, copper, stainless steel, aluminum, nickel, iron, titanium and carbon are exemplified. As a shape of the anode collector, a foil shape, a plate shape and a mesh shape are exemplified.

The anode may further include a conductive assistant and/or binder in the case, for example, that the anode active material is powdered. As material of the conductive assistant and binder, material same as the above-mentioned carrier carbon and binder of the air electrode may be used.

(Electrolyte)

The electrolyte is placed between the air electrode and the anode and performs ion conduction between the air electrode and the anode. As the electrolyte, a liquid electrolyte, a solid electrolyte, a gel electrolyte, a polymer electrolyte and the combinations thereof may be used. As the liquid electrolyte and a gel electrolyte, an aqueous electrolyte and a non-aqueous electrolyte may be used.

As the aqueous electrolyte, an alkali aqueous solution, an acid aqueous solution and the like are exemplified and may be appropriately selected depending on a kind of the anode active material. As the alkali aqueous solution, a potassium hydroxide aqueous solution, a sodium hydroxide aqueous solution and the like are exemplified. As the acid aqueous solution, a hydrochloric acid aqueous solution, a nitric acid aqueous solution, a sulfuric acid aqueous solution and the like are exemplified. Among these, as the aqueous electrolyte, the high alkali aqueous solution, such as 8M KOH, is preferable.

As the non-aqueous electrolyte, for example, an aprotic organic solvent and an ionic liquid are given. As the organic solvent, cyclic carbonate such as propylene carbonate (PC), ethylene carbonate (EC) and fluoroethylene carbonate (FEC), cyclic ester such as γ-butyrolactone (GBL), chain carbonate such as dimethy carbonate (DMC), diethyl carbonate (DEC) and, ethyl methyl carbonate (EMC), and the combinations thereof are exemplified. As the ionic liquid, N,N-diethyl-N-methyl-N-(2-methoxyethyl)ammonium bis(trifluoromethanesulfonyl)amide (DEMETFSA), N-methyl-N-propylpiperidinium bis(trifluoromethanesulfonyl)amide (PP13TFSA) and the combinations thereof are exemplified. Also, the organic solvent and the ionic liquid may be combined. In addition, a supporting salt may be dissolved in the organic solvent and the ionic liquid. As the supporting salt, $LiPF_6$, $LiBF_4$, $LiN(CF_3SO_2)_2$, $LiCF_3SO_3$ and the like are exemplified.

The gel non-aqueous electrolyte, which is obtained by adding polymer to the non-aqueous electrolyte, may be used. For example, the gelation method of the non-aqueous electrolyte is the method that the polymer such as polyethylene oxide (PEO), polyacrylonitrile (PAN), polyvinylidene fluoride (PVdF), polymethyl methacrylate (PMMA) or the like are added to the non-aqueous electrolyte.

(Other Components)

As other components, a separator (not shown) may be used. The separator is placed between the above-mentioned air electrode and the anode. As material of the separator, a porous film made of polyethylene or polypropylene is exemplified. The above-mentioned separator may be a single layer or multi layers.

(Battery Case)

As the battery case of the air battery, material, which is usually used for the battery case of the air battery, such a metal can, resin, a lamination pack and the like may be used. On the battery case, a hole through which air is supplied can be made at an arbitrary position, and for example, the hole is made at the surface touching the air side of the air electrode.

The use of the fibrous perovskite-type oxide catalyst according to the present embodiment is not limited to the above-described air electrode of the air battery. The fibrous perovskite-type oxide catalyst can be used for other cells or batteries, for example, a fuel cell as an air electrode.

EXAMPLES

Below, examples of the present invention will be described. The below examples are just only for explanation and does not limit the present invention to the examples.

In the below examples, the following apparatuses are used for respective measurements.

A measurement apparatus for charge and discharge characteristics: VMP3 produced by Bio-Logic Science Instruments SAS.

A measurement apparatus for specific surface area: BELSORP produced by MicrotracBEL Corp.

A measurement apparatus for Gurley Number: Gurley type Densometer (permeability tester) produced by Toyo Seiki Seisaku-Sho, Ltd.

(I) Evaluation Method of Fibrous Perovskite-Type Oxide Catalyst

Example 1

The sample of Example 1 was the fibrous perovskite-type oxide catalyst composed of $La_{0.2}Sr_{0.8}Fe_{0.6}Co_{0.4}O_3$. The precursor (PAN) of carbon having the function as the promotor and the additive agent ($Zn(NO_3)_2$) for increasing the specific surface area of the oxide were introduced in the manufacturing process. Here, ZnO, into which $Zn(NO_3)_2$ was converted, was finally dissolved and removed.

(1) Manufacturing of Sample
(1-1) Manufacturing of Precursor

First, the first solution was formed by mixing $La(NO_3)_3$, $Sr(NO_3)_2$, $Fe(NO_3)_3$, $Co(NO_3)_2$, $Zn(NO_3)_2$, PVP and DMAc. Here, the mole ratio of the salts of La, Sr, Fe and Co, that is, $La(NO_3)_3:Sr(NO_3)_2:Fe(NO_3)_3:Co(NO_3)_2$ was set to 2:8:6:4 such that the composition of the perovskite-type oxide catalyst would be $La_{0.2}Sr_{0.8}Fe_{0.6}Co_{0.4}O_3$. The amount of the metal salt of $Zn(NO_3)_2$ which was the additive agent was determined such that the weight ratio of $La_{0.2}Sr_{0.8}Fe_{0.6}Co_{0.4}O_3$ to ZnO after the heating process would be 1:1. The amount of the PVP was determined such that the weight ratio of the sum of the salts of La, Sr, Fe, Co and Zn to the PVP would be 1:9. The amount of the DMAc was determined such that the weight ratio of the sum of the PVP and the salts of La, Sr, Fe, Co and Zn to the DMAc would be 10:90.

Also, the second solution was formed by mixing PAN, PVP and DMAc. Here, the amounts of PAN, PVP and DMAc were determined such that the weight ratio of PAN, PVP and DAMc, that is, PAN:PVP:DAMc would be 8:2:8.

Next, the precursor fiber was produced by using the electrospinning method. In the electrospinning method, the first and second solutions were put into two syringes, respectively, and then the first solution and the second solution were jetted separately and simultaneously at the same constant speed from respective syringe nozzles to the collector while a predetermined voltage was applied between the syringe nozzle and the collector. Consequently, the precursor fibers in which the fibers of the first solution and the fibers of the second solution were tangled were formed on the collector. Here, detail conditions of the electrospinning method are shown below.

Applying voltage: 30 kV
Solution sending speed: 0.3 ml/hr
Traversing speed: 9.6 cm/min
Target rotating speed: 3 ml/min.
Polymer: Polyvinylpyrrolidone (PVP)
Polymer weight percent: 10 wt %
Distance between syringe nozzle and collector: 15 cm
Carbon precursor: Polyacrylonitrile (PAN)
Carbon precursor weight percent: 10 wt %
Atmospheric temperature: room temperature
Atmospheric relative humidity: equal to or less than 35%

(1-2) Manufacturing of Fibrous Perovskite-Type Oxide Catalyst

After the above-mentioned precursor fibers were crushed, the three-step heat treatment at the temperatures of 170° C., 500° C. and 650-950° C. was performed on the crushed precursor fibers in the aluminum boat to obtain the fibrous perovskite-type oxide catalyst.

Then, ZnO, to which $Zn(NO_3)_2$ was changed by the heat treatment, was dissolved and removed by impregnating the fibrous perovskite-type oxide catalyst with $NH_4Cl$ solution of 2M.

(1-3) Manufacturing of Electrode Body

The above-mentioned fibrous perovskite-type oxide catalyst, C65 (specific surface area: 65 $m^2/g$) of the carrier carbon produced by TIMCAL Graphite & Carbon and PTFE of the binder were physically mixed. After that, the mixture was rolled and therefore the sheet-like electrode body was formed. The weight ratio of the fibrous perovskite-type oxide catalyst, C65 and PTFE is 40:40:20.

(2) Evaluation of Sample
(2-1) Evaluation of Crystalline Characteristics

The crystal structure of the fibrous perovskite-type oxide catalyst obtained at the above-mentioned (1-2) was measured by the XRD (X-ray diffraction). Also, the surface structure of the fibrous perovskite-type oxide catalyst was measured by the SEM (Scanning Electron Microscope) or the TEM (Transmission Electron Microscope)

(2-2) Evaluation of Specific Surface Area

The specific surface area of the fibrous perovskite-type oxide catalyst obtained at the above-mentioned (1-2) was measured by the gas absorption method.

(2-3) Evaluation of Gurley Number

The Gurley number (a measure of a resistance of a film against gas permeation) of the electrode body obtained at the above-mentioned (1-3) using the fibrous perovskite-type oxide catalyst was measured by the Gurley test.

(2-4) Evaluation of Reduction Current

As the evaluation method of the oxygen reduction activity of the electrode obtained from the above-mentioned (1-3) using the fibrous perovskite-type oxide catalyst, the following CV measurement method was used. The CV measurement method was performed 3 cycles at the scanning rate of 10 mV/sec in the voltage rage of −0.5 V to 0.8V (vs. Hg/HgO). The electrode body obtained at the above-mentioned (1-3) was used as the air electrode (working electrode), a Pt mesh (2 cm×2 cm) was used as the counter electrode and a Hg/HgO electrode was used as the reference electrode.

Example 2

The sample of Example 2 was the fibrous perovskite-type oxide catalyst composed of $La_{0.2}Sr_{0.8}Fe_{0.6}Co_{0.4}O_3$, which is the same as Example 1. However, it was different from that of Example 1 in that the precursor (PAN) of carbon having the function as the promoter was not introduced in the manufacturing process.

The remaining process of the sample manufacturing and the sample evaluation are the same as those of Example 1.

Reference Example

The sample of Reference example was the fibrous perovskite-type oxide catalyst composed of $La_{0.2}Sr_{0.8}Fe_{0.6}Co_{0.4}O_3$. However, it was different from that of Example 1 in that the additive agent ($Zn(NO_3)_2$) for increasing the specific surface area of the oxide was not introduced in the manufacturing process.

The remaining process of the sample manufacturing and the sample evaluation are the same as those of Example 1.

Comparison Example 1

The sample of Comparison example 1 was the fibrous perovskite-type oxide catalyst composed of $La_{0.2}Sr_{0.8}Fe_{0.6}Co_{0.4}O_3$. However, it was different from that of Example 1 in that the both of the precursor (PAN) of carbon having the function as the promotor and the additive agent ($Zn(NO_3)_2$) for increasing the specific surface area of the oxide were not introduced in the manufacturing process.

The remaining process of the sample manufacturing and the sample evaluation are the same as those of Example 1.

Comparison Example 2

The sample of Comparison example 2 was the fibrous perovskite-type oxide catalyst composed of $La_{0.2}Sr_{0.8}Fe_{0.6}Co_{0.4}O_3$. However, it was different from that of Example 1 in that the manufacturing method of the precursor was not the method of the above-mentioned (1-1) but a citric acid complex method and in that the both of the precursor (PAN) of carbon having the function as the promotor and the additive agent ($Zn(NO_3)_2$) for increasing the specific surface area of the oxide were not introduced in the manufacturing process.

The remaining process of the sample manufacturing and the sample evaluation are the same as those of Example 1.

(1-1)' Manufacturing of Precursor Using Citric Acid Complex Method

The metal salts of $La(NO_3)_3$, $Sr(NO_3)_2$, $Fe(NO_3)_3$ and $Co(NO_3)_2$ was dissolved in a nitric acid aqueous solution and then ethanol in which citric acid of 2 equivalent weight for the metal cation was dissolved was added to the solution, which was stirred and mixed sufficiently. After that, the solution was mixed sufficiently at room temperature, stirred 2 hours at 70° C. using a reflux apparatus to form complex in which citric acid was coordinate to metal salt mixture. Then, the obtained product was heated 9 hours in a stepwise manner to 400° C. in an electric furnace, and after that, was heated 4 hours at 600° C. in a heating furnace.

The above-mentioned samples of the Examples, Reference example and Comparison examples are wrapped up in a table 1. The "ES method" means the electrospinning method.

TABLE 1

| | Catalyst composition | Manufacturing method | Additive agent (Zn salt) | Carbon source (PAN) |
|---|---|---|---|---|
| Example 1 | $La_{0.2}Sr_{0.8}Fe_{0.6}Co_{0.4}O_3$ | ES method | use | use |
| Example 2 | $La_{0.2}Sr_{0.8}Fe_{0.6}Co_{0.4}O_3$ | ES method | use | Not use |
| Reference Example 1 | $La_{0.2}Sr_{0.8}Fe_{0.6}Co_{0.4}O_3$ | ES method | Not use | use |
| Comparison example 1 | $La_{0.2}Sr_{0.8}Fe_{0.6}Co_{0.4}O_3$ | ES method | Not use | Not use |
| Comparison example 2 | $La_{0.2}Sr_{0.8}Fe_{0.6}Co_{0.4}O_3$ | citric acid complex method | Not use | Not use |

Figure 1:
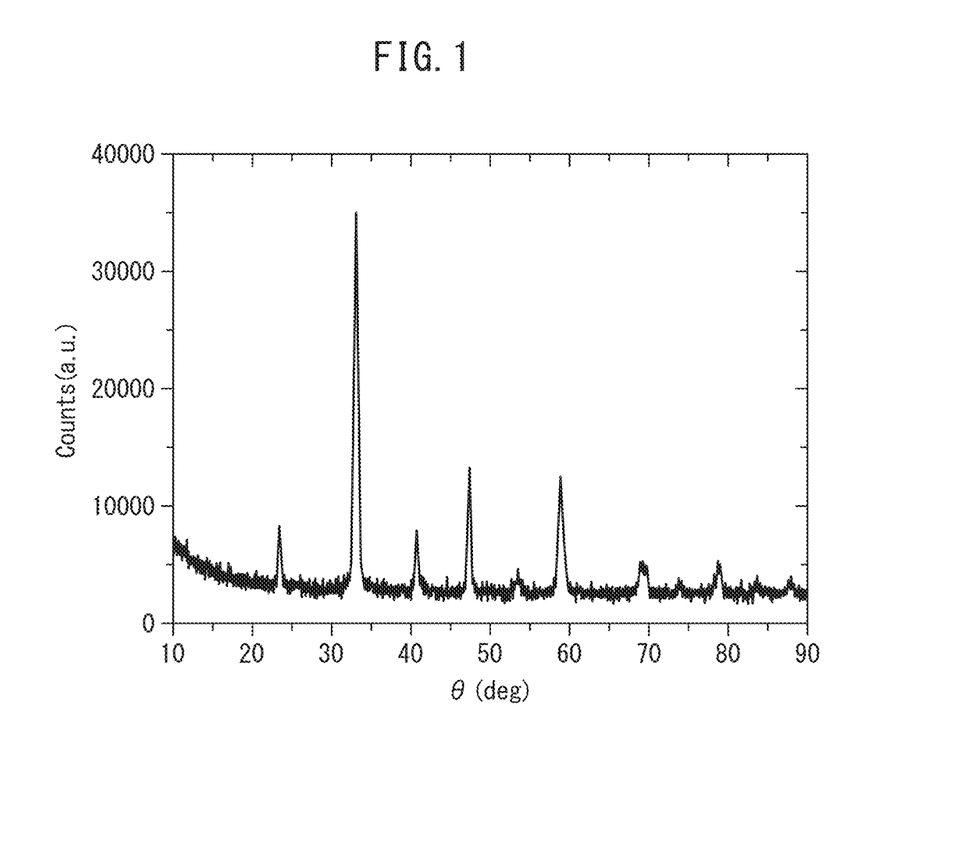
FIG. 1 is a diffraction pattern showing a XRD measurement result of a fibrous perovskite-type oxide catalyst of Example 1.

(II) Evaluation Result of Fibrous Perovskite-Type Oxide Catalyst (1) Evaluation of Crystalline Characteristics FIG. 1 is the diffraction pattern showing the XRD measurement result of the fibrous perovskite-type oxide catalyst composed of $La_{0.2}Sr_{0.8}Fe_{0.6}Co_{0.4}O_3$ of Example 1. The diffraction pattern belonging to the perovskite phase was detected and it was confirmed that Example 1 was the approximately single phase of the perovskite phase. Though not shown in the figure, it was confirmed that Example 2, Reference example, Comparison examples 1 and 2 were also the approximately single phase of the perovskite phase.

Figure 2:
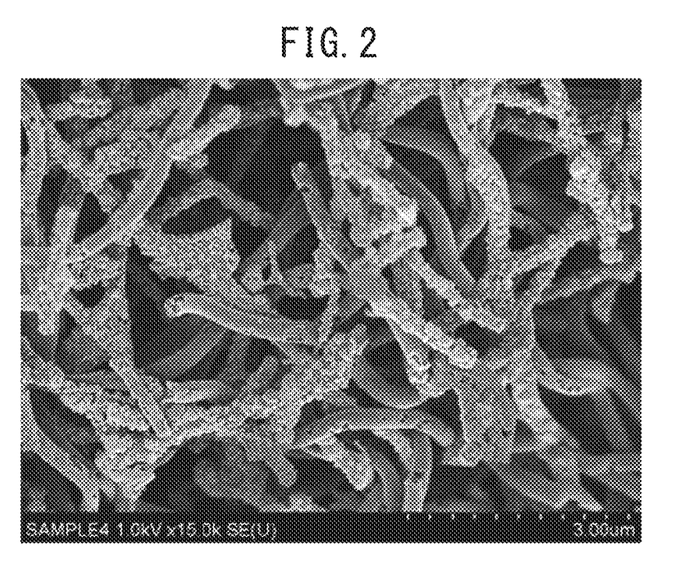
FIG. 2 is a photograph showing a SEM observation result of the fibrous perovskite-type oxide catalyst of Example 1.
Figure 3:
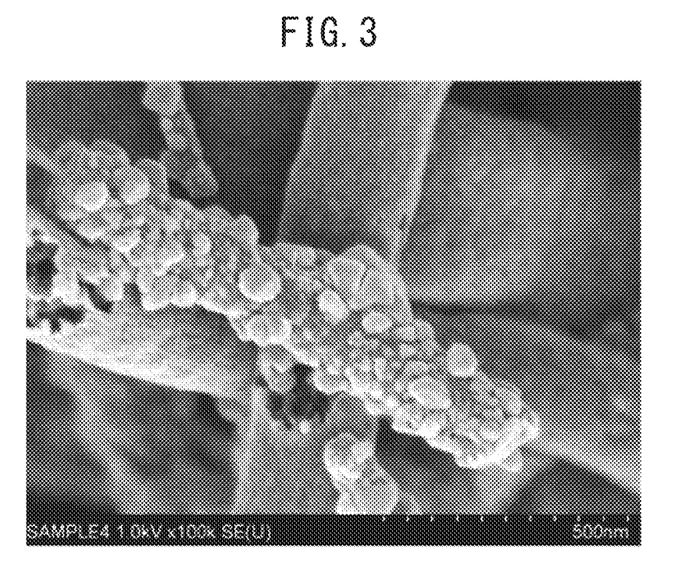
FIG. 3 is a photograph showing a SEM observation result of the fibrous perovskite-type oxide catalyst of Example 1.

FIGS. 2 and 3 are the photographs showing the SEM observation results of the fibrous perovskite-type oxide catalyst composed of $La_{0.2}Sr_{0.8}Fe_{0.6}Co_{0.4}O_3$ of Example 1. Here, FIG. 3 is the photograph in which a part of the photograph of FIG. 2 is enlarged. The wide of FIG. 2 corresponds to 2 μm and the wide of FIG. 3 corresponds to 500 nm. It was found that the fibrous perovskite-type oxide catalyst of Example 1 had a fibrous part formed of perovskite-type oxide catalyst and a granular part formed of carbon, and that the granular part of carbon was densely-deposited with the large quantity on the surface of the fibrous part of the perovskite-type oxide catalyst. Here, the granular part of carbon was formed by the carbon source (PAN) being carbonized due to the heat treatment. That is, the carbon was very close to the perovskite-type oxide catalyst and was placed at the position where the carbon easily interacted with the perovskite-type oxide catalyst. Therefore, the carbon was placed at the position where the carbon easily functioned as the promoter of the oxygen reduction reaction. In addition, it was found that the fibrous perovskite-type oxide catalyst had the fiber shape and the fibers were tangled to form the shape having a lot of gaps.

Figure 4:
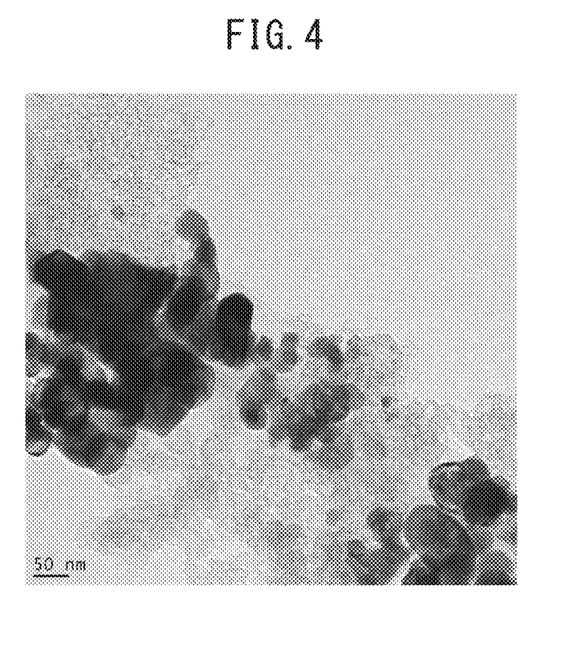
FIG. 4 is a photograph showing a TEM observation result of a perovskite-type oxide catalyst of Comparison example 2.

On the other hand, FIG. 4 is the photographs showing the TEM observation result of the perovskite-type oxide catalyst composed of $La_{0.2}Sr_{0.8}Fe_{0.6}Co_{0.4}O_3$ of the Comparison example 2 (citric acid complex method). The blackish parts show the perovskite-type oxide catalyst. It was found that the perovskite-type oxide catalyst had the powder form and did not have the fiber shape.

(2) Evaluation of Specific Surface Area (SSA)

The evaluation results are shown in the following Table 2. As shown in Table 2, the fibrous perovskite-type oxide catalyst (Example 1 and 2, Reference example and Comparison example 1) had high specific surface area as compared with that of the perovskite-type oxide catalyst by the citric acid complex method (Comparison example 2). Also, the fibrous perovskite-type oxide catalyst with introducing the precursor (PAN) which functioned as the promoter (Reference example) had high specific surface area as compared with that of the fibrous perovskite-type oxide catalyst without introducing the precursor (Comparison example 1). The reason is considered that the granular carbon was formed on the catalyst fiber. In addition, the fibrous perovskite-type oxide catalyst with introducing the additive agent ($Zn(NO_3)_2$) which used for enlarging the specific surface area (Example 2) had very high specific surface area as compared with that of the fibrous perovskite-type oxide catalyst without introducing the additive agent (Comparison example 1). The reason is considered that ZnO in the catalyst fiber was removed and therefore pores were increased. Furthermore, the fibrous perovskite-type oxide catalyst with introducing the both (Example 1) had the highest specific surface area. In particular, it was found that the specific surface area of the fibrous perovskite-type oxide catalyst of Examples 1 and 2 were equal to or more than 20 m$^2$/g.

(3) Evaluation of Gurley Number

The lower the Gurley number is, the higher the air permeability (a measure indicating how easy to permeate) is. The evaluation results are shown in the following Table 2. As shown in Table 2, the fibrous perovskite-type oxide catalyst (Example 1 and 2, Reference example and Comparison example 1) had low Gurley number and high air permeability as compared with those of the perovskite-type oxide catalyst by the citric acid complex method (Comparison example 2). Also, the fibrous perovskite-type oxide catalyst with introducing the precursor (PAN) which functioned as the promoter (Reference example) had low Gurley number as compared with that of the fibrous perovskite-type oxide catalyst without introducing the precursor (Comparison example 1). The reason is considered that gaps were increased due to the formation of the granular carbon. In addition, the fibrous perovskite-type oxide catalyst with introducing the additive agent (Zn(NO$_3$)$_2$) which used for enlarging the specific surface area (Example 2) had very low Gurley number as compared with that of the fibrous perovskite-type oxide catalyst without introducing the additive agent (Comparison example 1). The reason is considered that gaps were increased due to the formation of the pores. Furthermore, the fibrous perovskite-type oxide catalyst with introducing the both (Example 1) had the lowest Gurley number. In particular, it was found that the Gurley number of the fibrous perovskite-type oxide catalyst of Examples 1 and 2 were equal to or less than 4200 s. It is considered that such low Gurley number makes the oxygen reduction property high, particularly in high electric current range.

(4) Evaluation of Reduction Current

Figure 5:
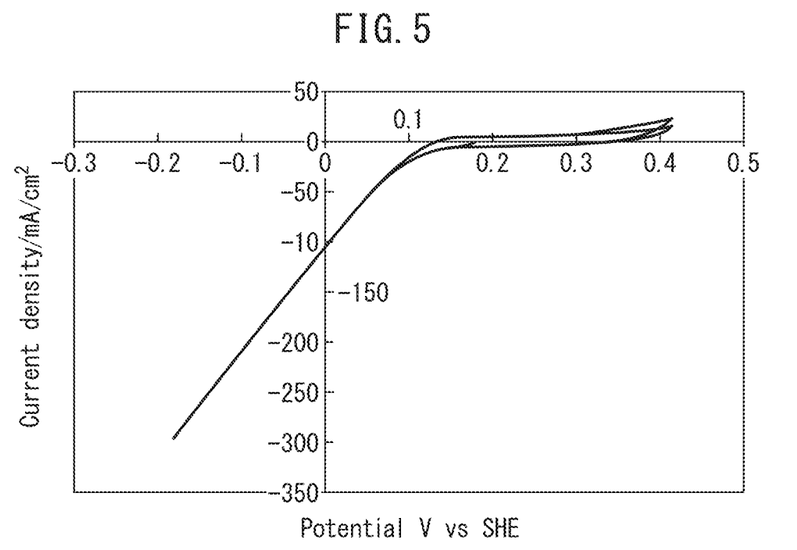
FIG. 5 is a graph showing a CV measurement result of the fibrous perovskite-type oxide catalyst of Example 1.
Figure 6:
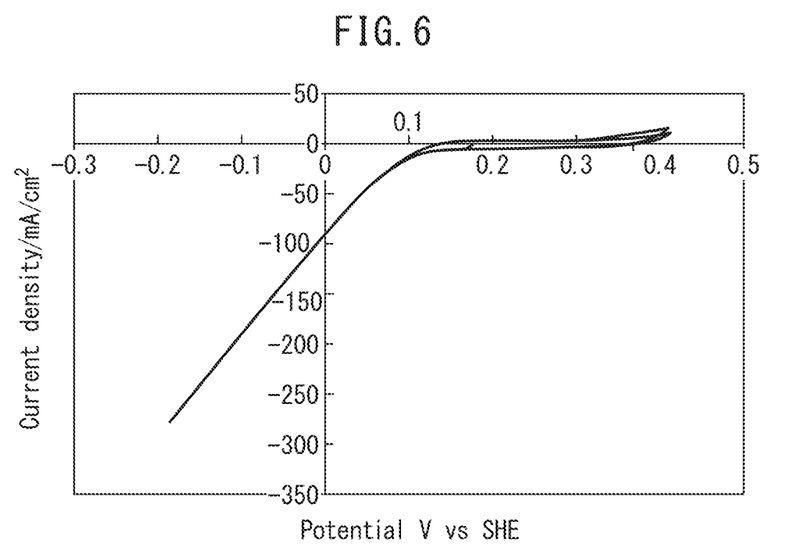
FIG. 6 is a graph showing a CV measurement result of a fibrous perovskite-type oxide catalyst of Example 2.
Figure 7:
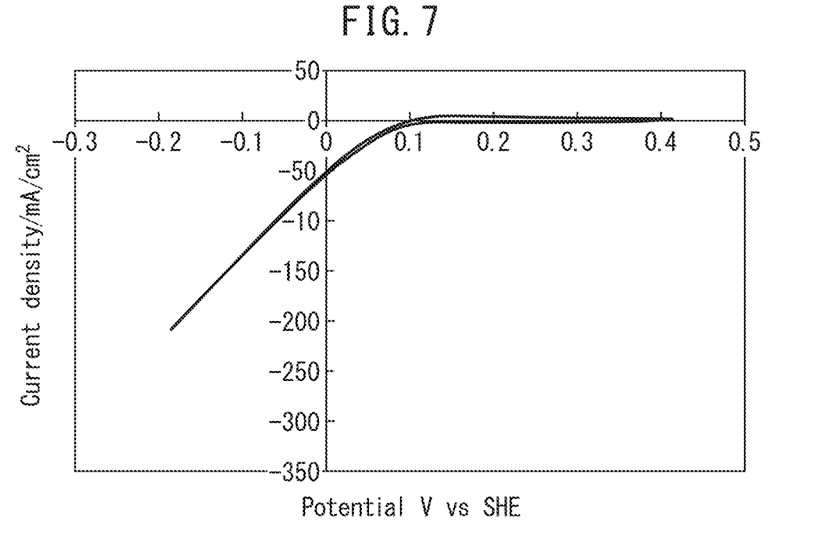
FIG. 7 is a graph showing a CV measurement result of a fibrous perovskite-type oxide catalyst of Reference example.
Figure 8:
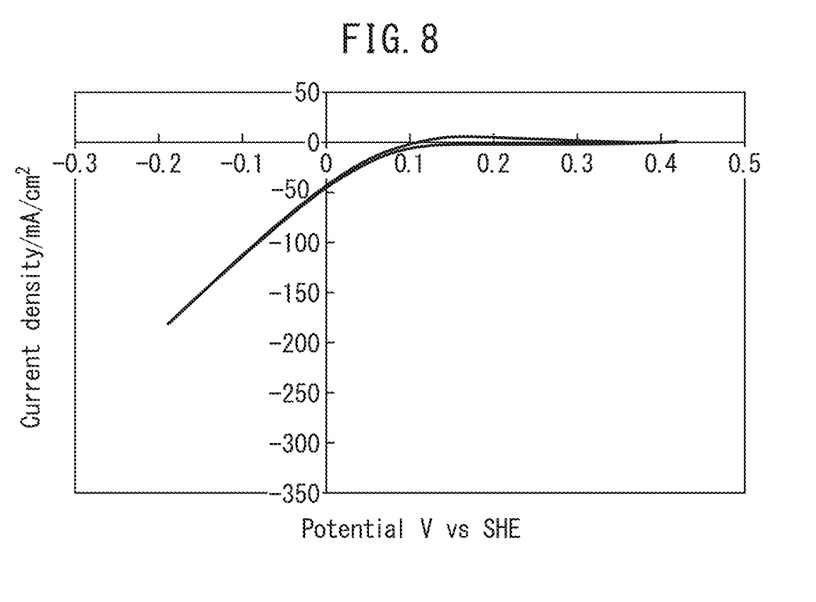
FIG. 8 is a graph showing a CV measurement result of a fibrous perovskite-type oxide catalyst of Comparison example 1.
Figure 9:
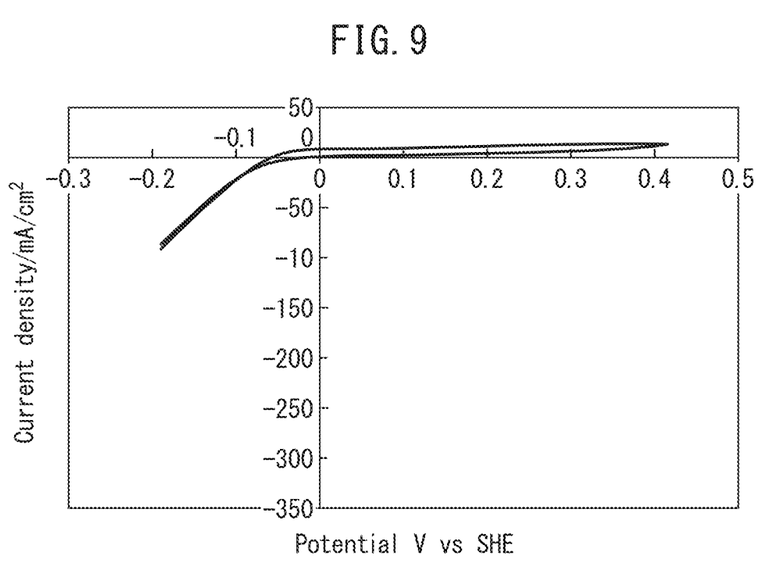
FIG. 9 is a graph showing a CV measurement result of the perovskite-type oxide catalyst of Comparison example 2.

FIGS. 5 to 7 are graphs showing CV measurement results of the fibrous perovskite-type oxide catalyst of Examples 1 and 2 and Reference example. FIGS. 8 to 9 are graphs showing CV measurement results of the perovskite-type oxide catalyst of Comparison examples 1 and 2. In these figures, the vertical axis shows the reduction current and the horizontal axis shows the potential (vs. SHE). These results are wrapped up in the table 2. As shown in Table 2, the fibrous perovskite-type oxide catalyst (Example 1 and 2, Reference example and Comparison example 1) had early falling of the oxygen reduction current graph and large reduction current value as compared with those of the perovskite-type oxide catalyst by the citric acid complex method (Comparison example 2). That is, the reaction speed of the oxygen reduction was high (horizontal axis-intercept of the graph) and the oxygen reduction activity was high. Also, the fibrous perovskite-type oxide catalyst with introducing the precursor (PAN) which functioned as the promoter (Reference example) had large reduction current value and therefore had high oxygen reduction activity as compared with those of the fibrous perovskite-type oxide catalyst without introducing the precursor (Comparison example 1). The reason is considered that 4-electron reduction reaction occurred effectively due to the formation of the granular carbon on the catalyst fibers. In addition, the fibrous perovskite-type oxide catalyst with introducing the additive agent (Zn(NO$_3$)$_2$) which used for enlarging the specific surface area (Example 2) had high reaction speed of the oxygen reduction, large reduction current value and therefore had high oxygen reduction activity as compared with those of the fibrous perovskite-type oxide catalyst without introducing the additive agent (Comparison example 1). The reason is considered that active sites of the electrochemical reaction were increased due to the increase of the pores. Furthermore, the fibrous perovskite-type oxide catalyst with introducing the both (Example 1) had the highest reaction speed of the oxygen reduction, the largest reduction current value and therefore had the highest oxygen reduction activity. In particular, it was found that the reduction current value of the fibrous perovskite-type oxide catalyst of Examples 1 and 2 were equal to or more than 250 mA/cm$^2$.

The above-mentioned evaluation result of Examples, Reference example and Comparison examples are wrapped up in the table 2.

TABLE 2

| Catalyst composition | SSA (m$^2$/g) | Gurley number (s) | Reduction current (mA/cm$^2$) |
| --- | --- | --- | --- |
| Example 1 | La$_{0.2}$Sr$_{0.8}$Fe$_{0.6}$Co$_{0.4}$O$_3$ | 44.6 | 4135 | 299.3 |
| Example 2 | La$_{0.2}$Sr$_{0.8}$Fe$_{0.6}$Co$_{0.4}$O$_3$ | 20.2 | 4175 | 276.4 |
| Reference Example 1 | La$_{0.2}$Sr$_{0.8}$Fe$_{0.6}$Co$_{0.4}$O$_3$ | 15.4 | 4686 | 207.5 |
| Comparison example 1 | La$_{0.2}$Sr$_{0.8}$Fe$_{0.6}$Co$_{0.4}$O$_3$ | 10.3 | 5132 | 179.1 |
| Comparison example 2 | La$_{0.2}$Sr$_{0.8}$Fe$_{0.6}$Co$_{0.4}$O$_3$ | 4.3 | 7300 | 87.6 |

What is claimed is:

1. A manufacturing method of a fibrous perovskite-type oxide catalyst comprising:
    a first preparing step of preparing a first solution by mixing metal salts comprising La, Sr, Fe, Co and O elements, a first polymer, a metal salt comprising a Zn element and a first solvent;
    a jetting step of jetting the first solution by using an electrospinning method to produce a precursor fiber;
    a heating step of heating the precursor fiber to produce a perovskite-type oxide mixed with a Zn oxide; and
    an impregnating step of impregnating the perovskite-type oxide with an alkaline solution to remove the Zn oxide.

2. The manufacturing method of the fibrous perovskite-type oxide catalyst according claim 1, further comprising:
    a second preparing step of preparing a second solution by mixing a material comprising a C element, a second polymer and a second solvent,
    wherein the first solution and the second solution are jetted concurrently by the electrospinning method in the jetting step.

3. The manufacturing method of the fibrous perovskite-type oxide catalyst according claim 1, wherein the metal salt comprising the Zn element includes Zn(NO$_3$)$_2$ in the first preparing step.

4. The manufacturing method of the fibrous perovskite-type oxide catalyst according claim 1, wherein the perovskite-type oxide includes La$_{0.2}$Sr$_{0.8}$Fe$_{0.6}$Co$_{0.4}$O$_3$ in the heating step.

* * * * *